United States Patent
Shiratani

(10) Patent No.: US 7,433,518 B2
(45) Date of Patent: Oct. 7, 2008

(54) IMAGE SELECTION SUPPORT SYSTEM FOR SUPPORTING SELECTION OF WELL-PHOTOGRAPHED IMAGE FROM PLURAL IMAGES

(75) Inventor: Fumiyuki Shiratani, Sagamihara (JP)

(73) Assignee: Olympus Corporation, Tokyo (JP)

( * ) Notice: Subject to any disclaimer, the term of this patent is extended or adjusted under 35 U.S.C. 154(b) by 611 days.

(21) Appl. No.: 10/158,686

(22) Filed: May 30, 2002

(65) Prior Publication Data

US 2002/0181784 A1    Dec. 5, 2002

(30) Foreign Application Priority Data

May 31, 2001    (JP)    ............... 2001-165125

(51) Int. Cl.
G06K 9/46    (2006.01)
G06K 9/00    (2006.01)
G06K 9/68    (2006.01)
G06K 9/62    (2006.01)

(52) U.S. Cl. ................. 382/190; 382/118; 382/156; 382/218

(58) Field of Classification Search ............. None
See application file for complete search history.

(56) References Cited

U.S. PATENT DOCUMENTS

| | | | | |
|---|---|---|---|---|
| 5,229,589 A | * | 7/1993 | Schneider | 235/456 |
| 5,414,811 A | * | 5/1995 | Parulski et al. | 345/501 |
| 5,539,426 A | * | 7/1996 | Nishikawa et al. | 345/635 |
| 5,608,542 A | * | 3/1997 | Krahe et al. | 358/449 |
| 5,793,901 A | * | 8/1998 | Matsutake et al. | 382/294 |
| 5,917,962 A | * | 6/1999 | Chen et al. | 382/291 |
| 5,978,523 A | * | 11/1999 | Linford et al. | 382/305 |
| 6,073,145 A | * | 6/2000 | Funabashi | 715/526 |
| 6,185,317 B1 | * | 2/2001 | Nakayama | 382/124 |
| 6,288,702 B1 | * | 9/2001 | Tachibana et al. | 345/671 |
| 6,292,574 B1 | * | 9/2001 | Schildkraut et al. | 382/117 |
| 6,348,940 B1 | * | 2/2002 | Sano et al. | 347/247 |
| 6,458,081 B1 | * | 10/2002 | Matsui et al. | 600/437 |
| 6,463,176 B1 | * | 10/2002 | Matsugu et al. | 382/195 |
| 6,584,221 B1 | * | 6/2003 | Moghaddam et al. | 382/165 |
| 6,813,395 B1 | * | 11/2004 | Kinjo | 382/305 |
| 6,836,554 B1 | * | 12/2004 | Bolle et al. | 382/116 |
| 6,933,950 B2 | * | 8/2005 | Kagawa et al. | 345/600 |

FOREIGN PATENT DOCUMENTS

JP    10-173984    6/1998

* cited by examiner

*Primary Examiner*—Charles Kim
(74) *Attorney, Agent, or Firm*—Straub and Pokotylo; John C. Pokotylo

(57) ABSTRACT

A feature area extracting section extracts an area having a unique feature in an image input to an image selection support apparatus. A specific area feature collating and determining section determines whether or not the area having a feature and extracted by the feature area extracting section is a specific area. A specific area image reading section decides a rectangular area including the specific area, and reads image information of the rectangular area. The specific area image reading section has at least one of an enlargement displaying section which enlarges and displays the image information read by the specific area image reading section, a thumbnail display section which reduces and displays the input image, and an original image displaying section which enlarges and displays the input image.

28 Claims, 10 Drawing Sheets

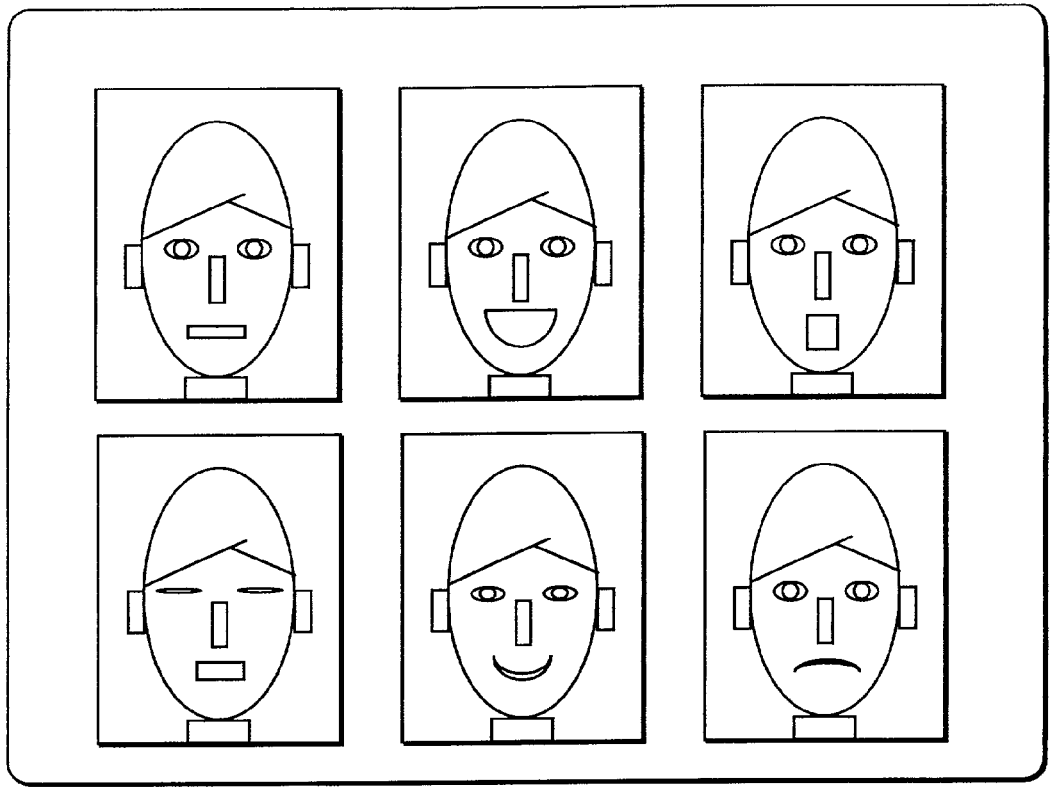
FIG. 9A  Expression comparing mode by partial enlargement of faces
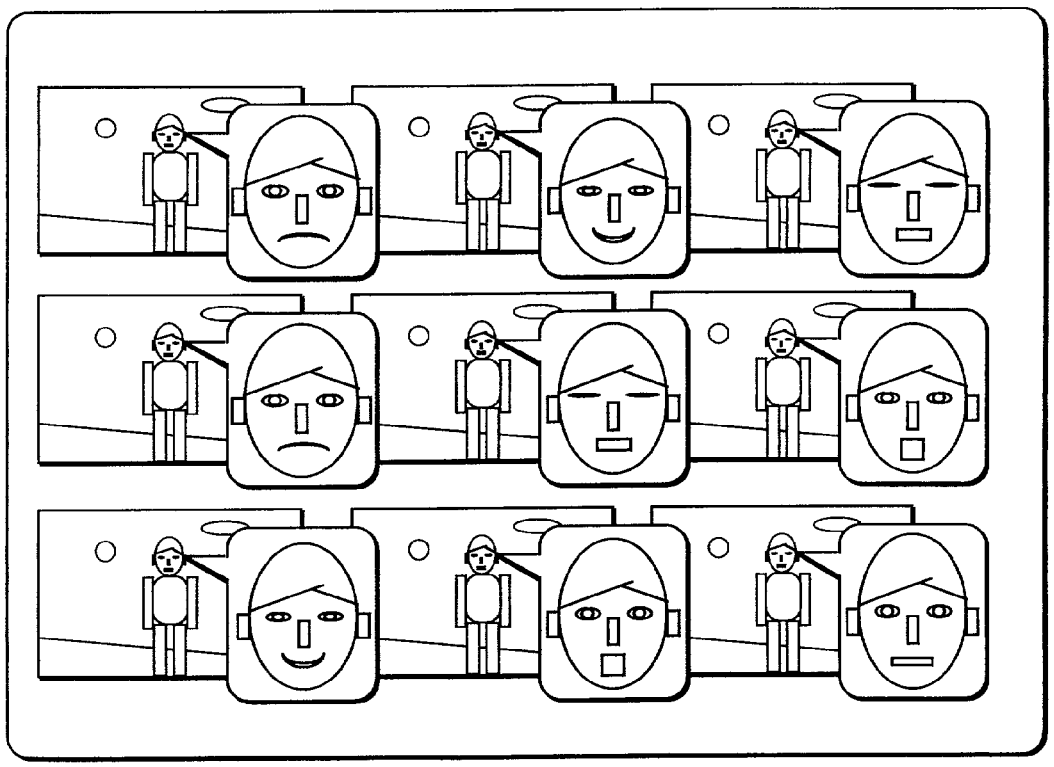
FIG. 9B  Linkage with thumbnails Thumbnail display Full-screen display

IMAGE SELECTION SUPPORT SYSTEM FOR SUPPORTING SELECTION OF WELL-PHOTOGRAPHED IMAGE FROM PLURAL IMAGES

CROSS-REFERENCE TO RELATED APPLICATIONS

This application is based upon and claims the benefit of priority from the prior Japanese Patent Application No. 2001-165125, filed May 31, 2001, the entire contents of which are incorporated herein by reference.

BACKGROUND OF THE INVENTION

1. Field of the Invention

The present invention relates to an image selection support apparatus, an image selection support method and an image selection support system including an image selection support program, and in particular, to an image selection support apparatus, an image selection support method and an image selection support system including an image selection support program which support selection of a well-photographed image of a person from plural images.

2. Description of the Related Art

In general, digital images photographed by a user by using a digital camera or the like are input to a personal computer (PC), and are stored therein.

At this time, because the photographed digital images are accumulated one after another in the PC, arranging the images is becoming more troublesome for the ordinary user.

On the other hand, for the ordinary user, there are needs such as the desire to pick up a well-photographed image from these digital images accumulated in the PC, and paste it in a New Year's card or make an albums of respective themes.

In this case, it is possible to create a final work by using commercially available software. However, the work of selecting a well-photographed image from a large number of images is particularly hard.

This work is carried out by using display software for browsing images. Two display methods have been conventionally provided as the form of the display form.

One of the display methods is a method by thumbnail (reduction) display as shown in FIG. 10A.

By using this thumbnail (reduction) display method, there is the merit that plural images can be seen at the same time.

The second display method is a method in which an enlarged image is displayed by a full-screen display as shown in FIG. 10B by selecting and clicking on such a thumbnail image with a mouse.

Generally, the user executes image sorting work by using the two types of images.

Further, in both display methods, a photograph taken longitudinally is displayed as an image turned laterally (rotated by 90°).

Of course, although a means for rotating the image by 90° to make it upright is provided, this process must be carried out on the images one-by-one.

However, with thumbnail (reduction) displayed images as described above, although the user can distinguish the basic composition and the like of the image, because the resolution is low, objects such as a person cannot be observed in detail.

Thus, the user needs to enlarge the reduced image in order to observe the object in detail.

This work has to be carried out on the images one-by-one in order by the user.

In particular, in the case of an upright full-length figure image or the like, because the face area is small, the user has to observe the face area by enlarging the full-length figure image to be full-screen. However, if plural images are open on the screen, the working efficiency is poor because the images are superposed on each other.

Moreover, in this process, when the user intends to narrow several similar images down to only well-photographed images, the user has to display a plurality of similar images as large images, and to compare the objects while moving the objects to the front and the back on the displayed screen.

Further, in all of the image browsing software currently presented, when the facial expression or the like of a person is observed, there is the problem that a photograph taken longitudinally is displayed as an image turned laterally (rotated by 90°).

Of course, in the entire image browsing software, longitudinal/lateral switching can be carried out for such images. However, it is not efficient for the user to carry out switching image-by-image.

In order to solve this problem, it is proposed, in Jpn. Pat. Appln. KOKAI Publication No. 10-173984, that longitudinal/lateral switching is applied to an image on the basis of top/bottom information obtained by mounting a top/bottom sensor to a digital camera, and the image is displayed as an upright image.

However, this method cannot handle the case in which an image is photographed by a digital camera without top/bottom information.

BRIEF SUMMARY OF THE INVENTION

In order to solve the above-described problem, an object of the present invention is to provide an image selection support apparatus, an image selection support method and an image selection support system including an image selection support program which support selection of a well-photographed image of a person from plural images.

In order to achieving the above object, according to a first aspect of the present invention, there is provided an image selection support apparatus comprising:

an image inputting section which inputs an image;

a feature area extracting section which extracts an area having a unique feature in the image input by the image inputting section;

a specific area feature collating and determining section which determines whether the area having a feature and extracted by the feature area extracting section is a specific area;

an image registration analyzing section comprised of a specific area inclusion area deciding/storing section which decides a rectangular area including the specific area and stores positions of vertices thereof in a memory;

a specific area inclusion area reading section which reads the positions of the vertices of the rectangular area including the specific area stored in the memory by the specific area inclusion area deciding/storing section;

an enlargement displaying section which enlarges and displays the specific area inclusion area read by the reading section;

a thumbnail display section which reduces and displays the image input by the image inputting section;

an image displaying section comprised of an original image displaying section enlarging and displaying the image input by the image inputting section;

an image selecting section, which allows to select a user desired image; and a selected image storing section which stores in a memory the image desired by the user and selected by the image selecting section.

According to a second aspect of the present invention, there is provided an image selection support apparatus according to the first aspect, wherein the image registration analyzing section further comprises:

an area dividing section which divides an image into units having meaning;

a feature amount extracting section which extracts a physical feature amount of each of the areas divided by the area dividing section;

a similarity determining section which determines similarities of the feature amounts extracted by the feature amount extracting section and feature amounts of other images; and an image display order deciding and storing section which decides a display order such that the images determined as being similar by the similarity determining section are displayed close to one another, and stores the display order in a memory, wherein the image displaying section further comprises an image display order reading section which reads the display order of the images stored in the memory by the display order determining and storing section.

According to a third aspect of the present invention, there is provided an image selection support apparatus according to the first aspect, wherein the image registration analyzing section further comprises:

an area dividing section which divides an image into units having meaning;

a feature amount extracting section which extracts a physical feature amount of each of the areas divided by the area dividing section;

an image photographed state evaluating section which determines goodness/poorness of the photography of each of the areas divided by the area dividing section, on the basis of the feature amounts extracted by the feature amount extracting section; and an image display order deciding and storing section which decides a display order such that the images are displayed in accordance with the goodness/poorness of the photography of the respective areas evaluated by the image photographed state evaluating section, and stores the display order in a memory, wherein the image displaying section further comprises an image display order reading section which reads the display order of the images stored in the memory by the display order determining and storing section.

According to a fourth aspect of the present invention, there is provided an image selection support apparatus according to the first aspect, wherein the image registration analyzing section comprises an orientation determining section which determines top/bottom orientation of an image, and the image displaying section comprises an image rotating converting section which rotates an image 90° to the right or the left, on the basis of output of the orientation determining section.

According to a fifth aspect of the present invention, there is provided an image selection support method comprising:

inputting an image;

extracting an area having a unique feature within the input image;

determining whether the extracted area having the feature is a specific area;

deciding a rectangular area including the specific area, and storing positions of vertices thereof in a first memory area;

reading the positions of the vertices of the rectangular area including the specific area stored in the first memory area;

enlarging and displaying the read specific area inclusion area;

reducing the input image and displaying a thumbnail image;

enlarging the input image and displaying the original image;

selecting a desired image by a user; and storing, in a second memory area, the desired image selected by the user.

According to a sixth aspect of the present invention, there is provided an image selection support method according to the fifth aspect, wherein a rectangular area including the specific area is determined, and storing positions of vertices of the rectangular area are stored in a first memory area, the method comprising:

dividing an image into units having meaning;

extracting a physical feature amount of each of the divided areas;

determining similarities of the extracted feature amounts and feature amounts of other images; and deciding a display order such that images determined as being similar are displayed close to one another, and storing the display order in the first memory area.

According to a seventh aspect of the present invention, there is provided an image selection support method according to the fifth aspect, wherein a rectangular area including the specific area is determined, and positions of vertices of the rectangular area are stored in a first memory area, the method comprising:

dividing an image into units having meaning;

determining and evaluating goodness/poorness of the photography of each of the divided areas; and deciding a display order such that the images are displayed in accordance with the goodness/poorness of the photography of the respective determined and evaluated areas, and storing the display order in the first memory area, and displaying the original image comprises reading the display order of the images stored in the first memory area.

According to an eighth aspect of the present invention, there is provided an image selection support method according to the fifth aspect, wherein a rectangular area including the specific area is determined, and positions of vertices of the rectangular area are stored in a first memory area, the method comprising:

determining top/bottom orientation of an image, and displaying the original image comprises:

rotating an image by 90° to the right or the left, on the basis of output of the orientation determination.

According to a ninth aspect of the present invention, there is provided a computer readable program to support image selection by a computer, comprising:

a first computer readable program which makes the computer execute an image inputting step of inputting an image;

a second computer readable program which makes the computer execute a feature area extracting step of extracting an area having a unique feature within the image input in the image inputting step;

a third computer readable program which makes the computer execute a specific area feature collating step of determining whether or not the area having the feature and extracted in the feature area extracting step is a specific area;

a fourth computer readable program which makes the computer execute an image registration analyzing step comprised of a specific area inclusion area deciding/storing step of deciding a rectangular area including the specific area and storing positions of vertices thereof in a first memory area;

a fifth computer readable program which makes the computer execute a specific area inclusion area reading step of reading the positions of the vertices of the rectangular area including the specific area stored in the first memory area by the specific area inclusion area deciding/storing step;

a sixth computer readable program which makes the computer execute an enlargement displaying step of enlarging and displaying the specific area inclusion area read by the reading step;

a seventh computer readable program which makes the computer execute a thumbnail display step of reducing and displaying the image input by the image inputting step;

an eighth computer readable program which makes the computer execute an image displaying step comprised of an original image displaying step of enlarging and displaying the image input by the image inputting step;

a ninth computer readable program which makes the computer execute an image selecting step, which allows a user to select a desired image; and a tenth computer readable program which makes the computer execute a selected image storing step of storing in a second memory area the image desired by the user and selected by the image selecting step.

According to a tenth aspect of the present invention, there is provided a computer readable program according to the ninth aspect, wherein the fourth computer readable program which makes the computer execute an image registration analyzing step comprises:

an eleventh computer readable program which makes the computer execute an area dividing step of dividing an image into units having meaning;

a twelfth computer readable program which makes the computer execute a feature amount extracting step of extracting a physical feature amount of each of the areas divided by the area dividing step;

a thirteenth computer readable program which makes the computer execute a similarity determining step of determining similarities of the feature amounts extracted by the feature amount extracting step and feature amounts of other images; and a fourteenth computer readable program which makes the computer execute an image display order deciding and storing step of deciding a display order such that the images determined as being similar by the similarity determining step are displayed close to one another, and storing the display order in the first memory area, the eighth computer readable program which makes the computer execute the image displaying step comprises:

a fifteenth computer readable program which makes the computer execute an image display order reading step of reading the display order of the images stored in the first memory area by the display order determining and storing step.

According to an eleventh aspect of the present invention, there is provided a computer readable program according to the ninth aspect, wherein the fourth computer readable program which makes the computer execute the image registration analyzing step comprises:

an eleventh computer readable program which makes the computer execute an area dividing step of dividing an image into units having meaning;

a twelfth computer readable program which makes the computer execute an image photographed state evaluating step of determining the goodness/poorness of the photography of each of the areas divided by the area dividing step; and a thirteenth computer readable program which makes the computer execute an image display order deciding and storing step of deciding a display order such that the images are displayed in accordance with the goodness/poorness of the photography of the respective areas evaluated by the image photographed state evaluating step, and storing the display order in the first memory area, and the eighth computer readable program which makes the computer execute the image displaying step comprises:

a fourteenth computer readable program which makes the computer execute an image display order reading step of reading the display order of the images stored in the first memory area by the display order determining and storing step.

According to a twelfth aspect of the present invention, there is provided a computer readable program according to the ninth aspect, wherein the fourth computer readable program which makes the computer execute the image registration analyzing step comprises:

an eleventh computer readable program which makes the computer execute an orientation determining step of determining top/bottom orientation of an image, and the eighth computer readable program which makes the computer execute the image displaying step comprises:

a twelfth computer readable program which makes the computer execute an image rotating converting step of rotating an image by 90° to the right or the left, on the basis of output of the orientation determining step.

According to a thirteenth aspect of the present invention, there is provided an image selection support apparatus comprising:

a feature area extracting section which extracts an area having a unique feature in an image input to the image selection support apparatus;

a specific area feature collating and determining section which determines whether the area having a feature and extracted by the feature area extracting section is a specific area; and a specific area image reading section which decides a rectangular area including the specific area, and reads image information of the rectangular area.

According to a fourteenth aspect of the present invention, there is provided an image selection support apparatus according to the thirteenth aspect, wherein the specific area image reading section further comprises at least one of: an enlargement displaying section which enlarges and displays the image information read by the specific area image reading section; a thumbnail display section which reduces and displays the input image; and an original image displaying section which enlarges and displays the input image.

According to a fifteenth aspect of the present invention, there is provided an image selection support method comprising:

extracting an area having a unique feature in an input image;

determining whether or not the extracted area having a feature is a specific area; and deciding a rectangular area including the specific area, and reading image information of the rectangular area.

According to a sixteenth aspect of the present invention, there is provided a computer readable program to support image selection by a computer, comprising:

a first computer readable program which makes the computer execute a feature area extracting step of extracting an area having a unique feature in an input image;

a second computer readable program which makes the computer execute a specific area feature collating step of determining whether the area having a feature and extracted by the feature area extracting step is a specific area; and a third computer readable program which makes the computer execute a specific area image reading step of deciding a rectangular area including the specific area, and reading image information of the rectangular area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9A is a diagram showing a case in which a plurality of rectangles including a face area are enlargement-displayed with respect to images arranged in order of photographed dates by an enlargement displaying section 106 in the image selection support apparatus in accordance with the first embodiment of the present invention;

FIG. 9B is a diagram showing a case in which, in order to understand the relationship between the enlarged images of the faces shown in FIG. 9A and the original images, they are linked by, for example, balloon signs.

DETAILED DESCRIPTION OF THE INVENTION

Figure 1:
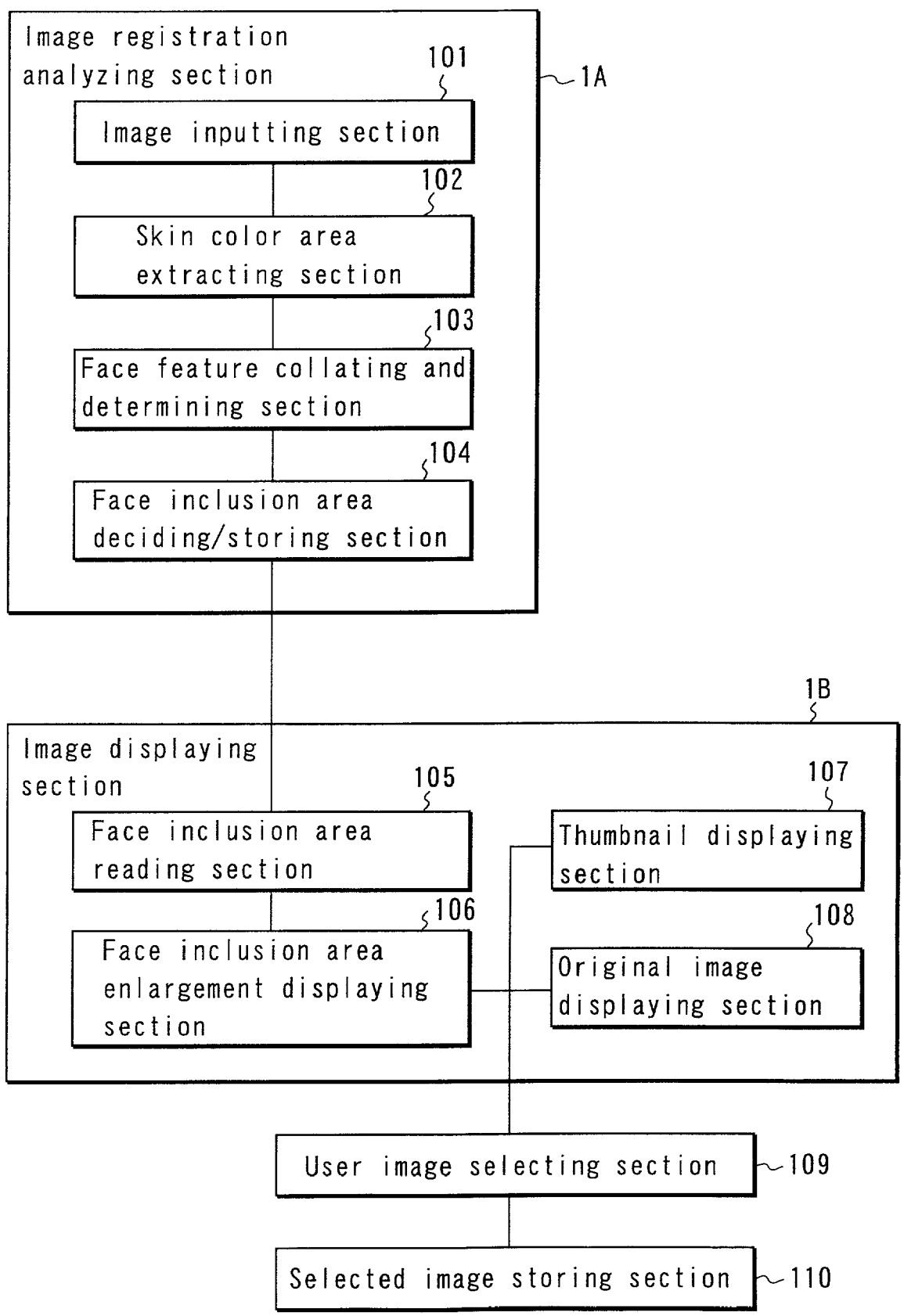
FIG. 1 is a block diagram showing a configuration of an image selection support apparatus, an image selection support method, and an image selection support program in accordance with a first embodiment of the present invention.

Reference will now be made in detail to the presently preferred embodiments of the invention as illustrated in the accompanying drawings, in which like reference numerals designate like or corresponding parts.

Hereinafter, embodiments of the present invention will be described with reference to the figures.

First Embodiment

FIG. 1 is a block diagram showing a configuration of an image selection support apparatus, an image selection support method, and an image selection support system in accordance with a first embodiment of the present invention.

First, the configuration of the image selection support apparatus, the image selection support method, and the image selection support system in accordance with the first embodiment of the present invention will be described with reference to FIG. 1.

In FIG. 1, reference numeral 1A is an image registration analyzing section which determines whether or not there is a face (specific image) in an image, and writes the position and size of the face into a memory when it is determined that there is a face.

The image registration analyzing section 1A is comprised of sections denoted by reference numerals 101 to 104.

Namely, reference numeral 101 is an image inputting section which takes an image photographed by a digital camera or the like into the apparatus.

Further, reference numeral 102 is a skin color area extracting section (feature area extracting section) which extracts a skin color area (an area having a unique feature) from an image taken in at the image inputting section 101.

Further, reference numeral 103 is a face feature collating and determining section (specific area feature collating and determining section) which collates the skin color area extracted by the skin color area extracting section 102 with a face feature prepared in advance, and determines whether or not the skin color area is a face area (specific area).

Further, reference numeral 104 is a face inclusion area deciding/storing section (specific area inclusion area deciding/storing section) which decides a rectangular area including a face and stores the positions of the vertices of the rectangular area into the memory.

Moreover, in FIG. 1, reference numeral 1B is an image displaying section, and this is comprised of portions denoted by reference numerals 105 to 108.

Namely, reference numeral 105 is a face inclusion area reading section.

Further, reference numeral 106 is a face inclusion area enlargement displaying section.

Further, reference numeral 107 is a thumbnail displaying section.

Further, reference numeral 108 is an original image displaying section.

Moreover, in FIG. 1, reference numeral 109 is an image selecting section by which a user selects a preferred image.

Further, reference numeral 110 is a selected image storing section which stores the image selected with the image selecting section 109 into the memory.

Next, operations will be described.

Figure 2:
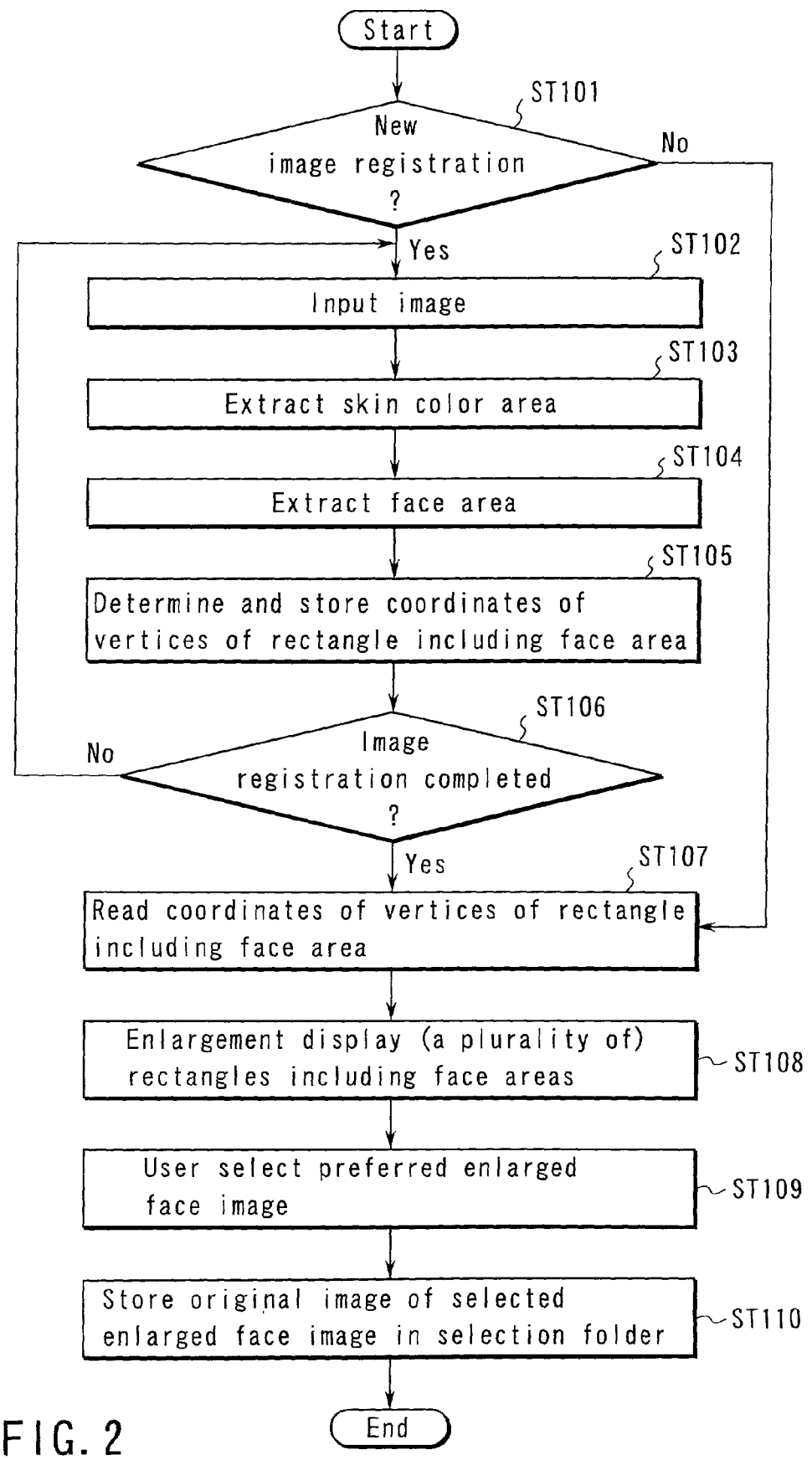
FIG. 2 is a flowchart for explaining operation of the image selection support apparatus, the image selection support method, and the image selection support program in accordance with the first embodiment of the present invention.

FIG. 2 is a flowchart for explaining operation of the image selection support apparatus, the image selection support method, and the image selection support program in accordance with the first embodiment of the present invention.

First, the overall flow will be described simply.

First, determination of whether or not the image registration is new is executed on the basis of a selection of a user (step ST101).

At this step ST101, if the image registration is not new, reading processing of the coordinates of the vertices including a face area is executed (step ST107).

Further, if the image registration at step ST101 is new, RGB color image data is input at the image inputting section 101 (step ST102).

Next, in the skin color area extracting section 102, processing for converting, for example, RGB values of the respective pixels to a uniform color space (three-dimensional vector arrangement) comprised of hue, saturation, and lightness, is executed.

At this time, connecting area processing which, on the basis of this three-dimensional vector arrangement, extracts skin color pixels by using a Kohonen-type learning vector quantization neural net which has already learned skin color data, and adds the same label to adjacent skin color pixels, is executed (step ST103).

Next, in the face feature collating and determining section 103, processing, which elliptically approximates the skin color area extracted at step ST103, and investigates whether or not facial features such as the eyes, mouth, and the like can be detected in the vicinities of predetermined positions in the ellipse, and determines that the skin color area is a face when the features can be detected, is executed (step ST104).

Moreover, in the face inclusion area deciding/storing section 104, processing, which calculates the coordinates of four vertices of, for example, a rectangular area including the detected face, and stores the values into the memory, is executed (step ST105).

It is determined whether or not image registration is continuing, and if it is, the routine returns to the image input processing (step ST102), and the processing thus far is repeated (step ST106).

If image registration is terminated at this step 106, the routine proceeds to enlargement display of the face area (step ST108) via the processing of previously-described step ST107.

First, at step ST107, processing, which reads the coordinates of the vertices including the face area from the memory of the face inclusion area deciding/storing section 104, is executed.

Next, at step ST108, processing, which enlargement-displays a plurality of rectangles including the face area by the enlargement display section 106, is executed for, for example, images arranged in order of date and time of being photographed.

FIG. 9A shows this situation.

At this time, as shown in FIG. 9B, in order to show the relationship between the enlarged images of the faces and the original images, they may be linked by, for example, balloon signs.

Next, processing in which a face image preferred by the user is selected by the user with the image selecting section 109 from the plurality of face images displayed in this way is executed (step ST109).

Finally, processing in which the original image of the selected face image is stored in a selection folder of the selected image storing section 110 is executed (step ST110).

In this way, a series of different types of processing is completed.

Second Embodiment

In the above-described first embodiment, a face area in the image is recognized, and the (plurality of) areas are enlargement-displayed, the display order corresponding to, for example, lining up the images in order of date and time of being photographed by using information recorded in the header portions of the images.

In this second embodiment, the point in which images having similar content are disposed and displayed so as to be closely lined up is different from the first embodiment described above.

Figure 3:
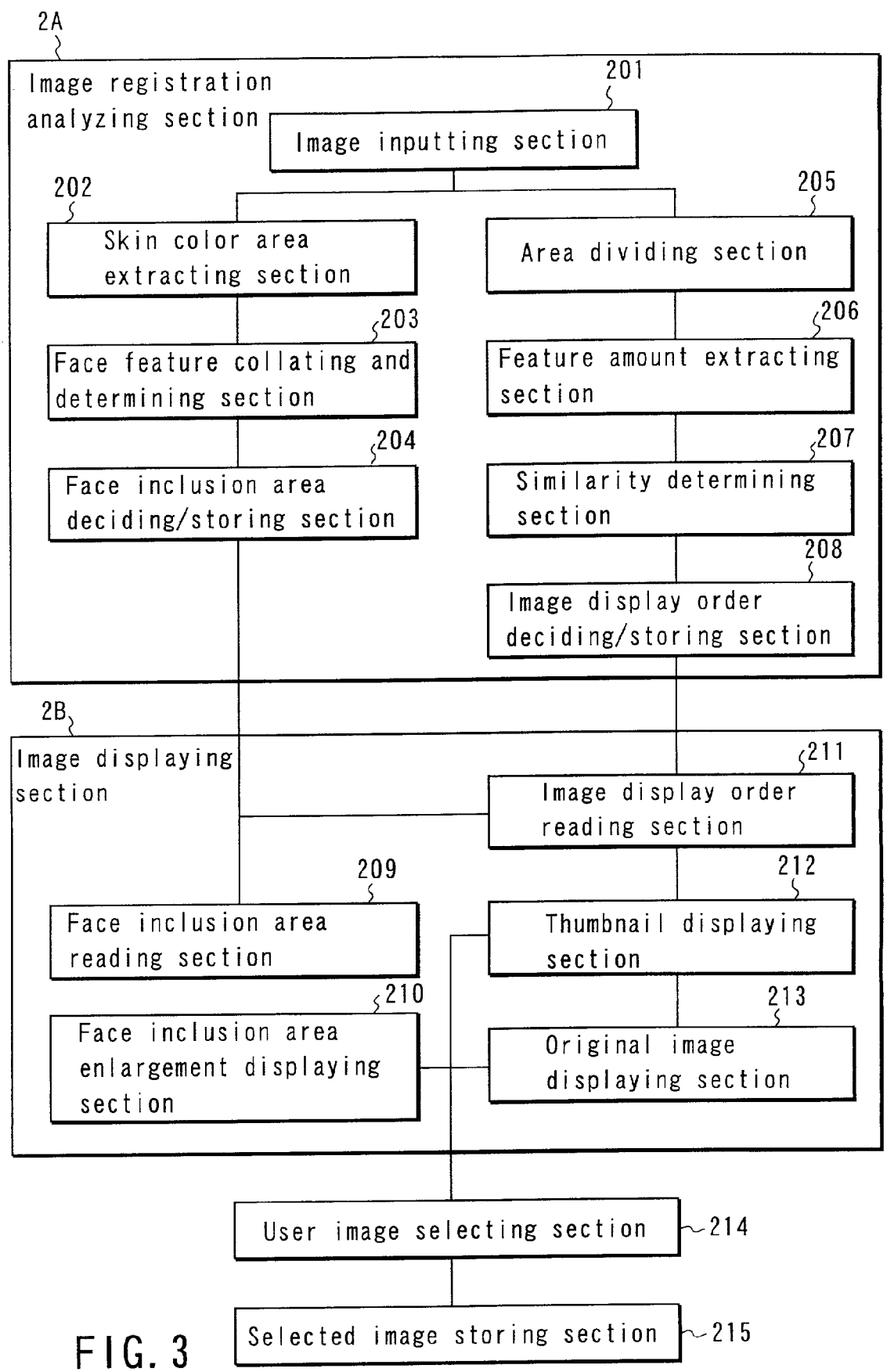
FIG. 3 is a block diagram showing a configuration of an image selection support apparatus, an image selection support method, and an image selection support program in accordance with a second embodiment of the present invention.

FIG. 3 is a block diagram showing a configuration of an image selection support apparatus, an image selection support method, and an image selection support program in accordance with the second embodiment of the present invention.

Next, the configuration of the image selection support apparatus, the image selection support method, and the image selection support program in accordance with the second embodiment will be described in accordance with FIG. 3.

Namely, as shown in FIG. 3, a configuration having an image inputting section 201, a skin color area extracting section 202, a face feature collating and determining section 203, and a face inclusion area deciding/storing section 204 in an image registration analyzing section 2A, and a configuration having a face inclusion area reading section 209, a face inclusion area enlargement displaying section 210, a thumbnail displaying section 212, and an original image displaying section 213 in an image displaying section 2B, and a configuration having an image selecting section 214 by which a user selects a preferred image, and a selected image storing section 215 which stores the image selected in the image selecting section 214 in a memory, are similar to the case of the image selection support apparatus in accordance with the above-described first embodiment.

Then, the point that there are an area dividing section 205, a feature amount extracting section 206, a similarity determining section 207, and an image display order deciding/storing section 208 in the image registration analyzing section 2A, and the point that there is an image display order reading section 211 in the image displaying section 2B, are different from those of the above-described first embodiment.

Next, the flow of processing of the second embodiment of the present invention will be described in accordance with FIG. 4.

Figure 4:
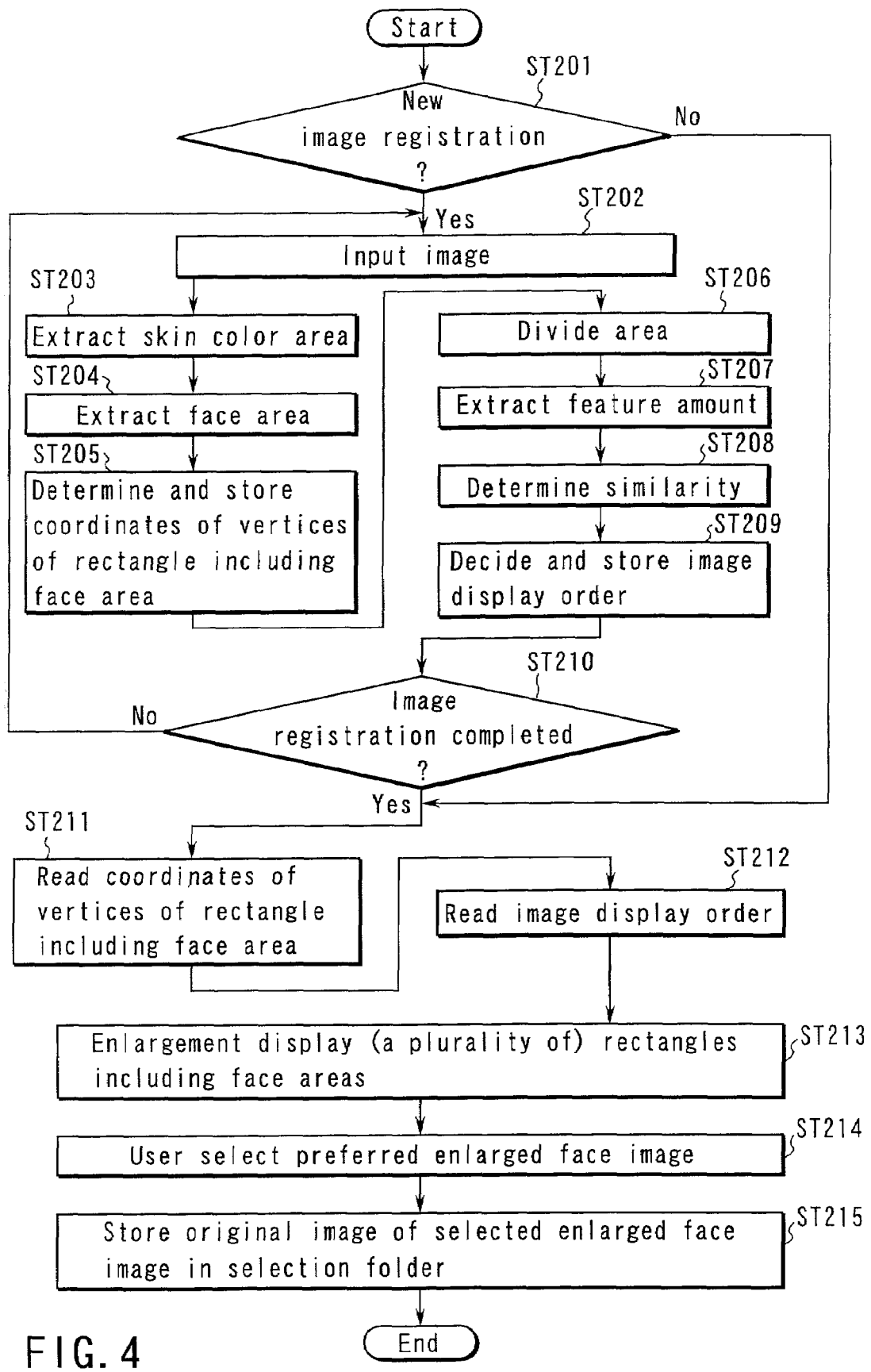
FIG. 4 is a flowchart for explaining operation of the image selection support apparatus, the image selection support method, and the image selection support program in accordance with the second embodiment of the present invention.

FIG. 4 is a flowchart showing for explaining operation of the image selection support apparatus, the image selection support method, and the image selection support program in accordance with the second embodiment of the present invention.

Namely, as shown in FIG. 4, the processes from image input processing (step ST201) to analyzing processing (steps ST201 through ST205) are similar to steps ST101 through ST105 from image input processing to analyzing processing of the above-described first embodiment.

Next, in this second embodiment, processing in which after, for example, RGB values of the respective pixels are converted to a uniform color space (three-dimensional vector arrangement) comprised of hue, saturation, and lightness, on the basis of this three-dimensional vector arrangement, the area is divided in accordance with colors by using a Kohonen self-organizing neural net in the area dividing section 205, is executed (step ST206).

Next, in the face feature amount extracting section 206, processing, in which a feature amount such as, for example, a color histogram, or a degree of roundness of an area is extracted, is executed for the respective divided areas (step ST207).

Further, in the similarity determining section 207, processing, in which the feature amount extracted in step ST207 is compared with the feature amount of another image, and images having similar values of the feature amount are determined to be similar to each other, is executed (step ST208).

In this case, processing, in which the similar images are ordered so as to be closely lined up and the order is stored in a memory of the image display order deciding/storing section 208, is executed (step ST209).

Then, at step ST210, it is determined whether or not image registration is being continued, and if it is still, the routine returns to the image input processing (step ST202), and the processing thus far is repeated.

Further, if image registration is terminated at step ST210, the routine proceeds to an enlargement display of a face area via step ST211 and step ST212 (step ST213).

First, at step ST211, processing, in which the coordinates of the vertices including the face area are read from the memory of the face inclusion area deciding/storing section 204, is executed (step ST211).

Next, at step ST212, processing, in which the display order of the images ordered in accordance with the similarities of the images is read from the memory of the image display order deciding/storing section 208, is executed.

Next, at step ST213, in the face inclusion area enlargement displaying section 213, processing, in which a plurality of rectangles including the face areas are enlargement-displayed in the order of the display order, is executed.

Next, in the image selecting section 214, processing, in which a user selects a preferred face image among the plurality of face images displayed, is executed (step ST214).

Finally, in the selected image storing section 215, processing, in which the original image of the selected face image is stored in a selection folder, is executed (step ST215).

In this way, the processing is completed.

Third Embodiment

In the above-described second embodiment, the images having similar contents are arranged so as to be closely lined up, and the enlarged images of faces are displayed.

This third embodiment employs an apparatus in which the goodness/poorness of photographs is evaluated and the photographs are lined up and displayed in order of photographic quality.

Figure 5:
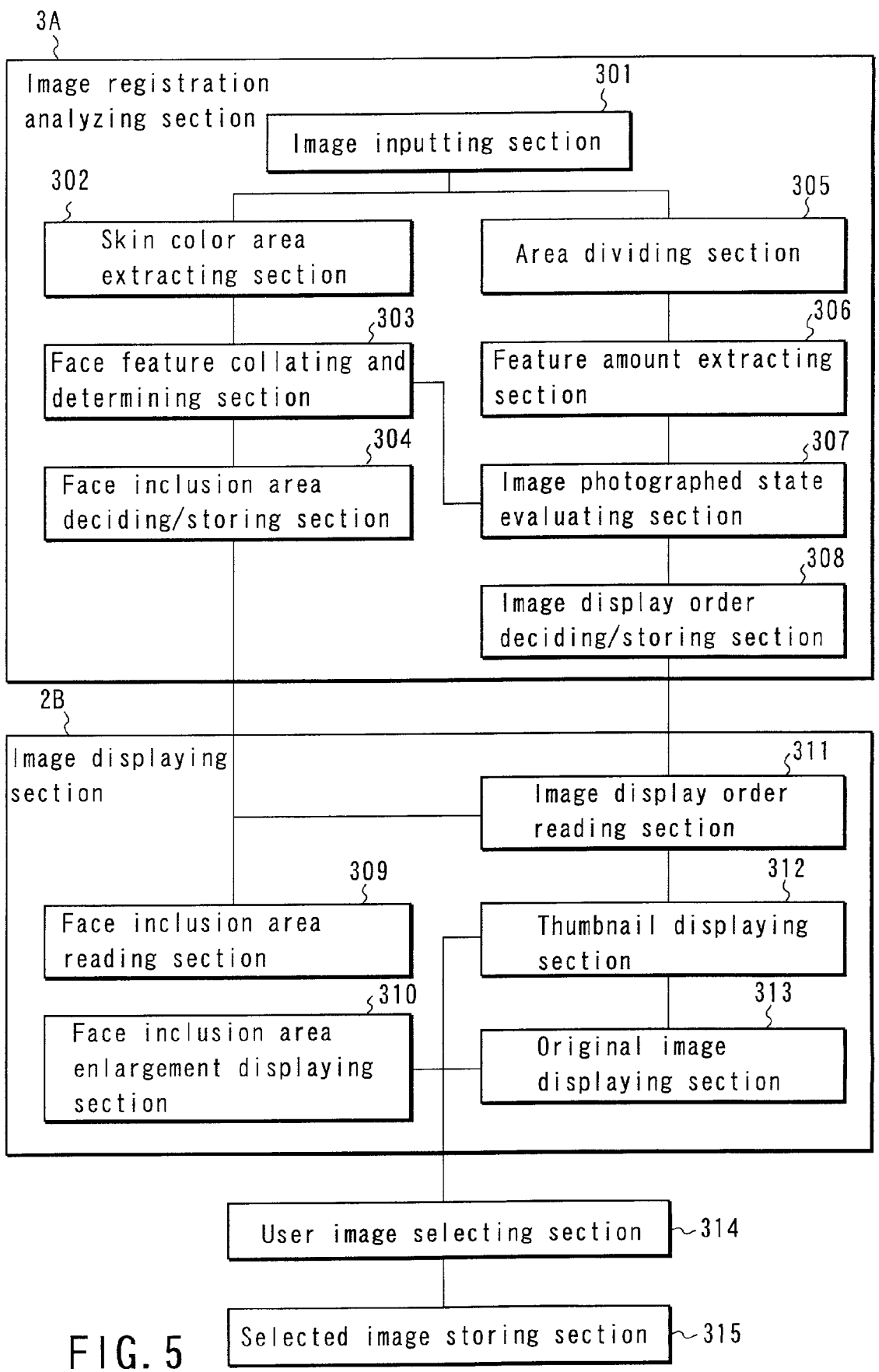
FIG. 5 is a block diagram showing a configuration of an image selection support apparatus, an image selection support method, and an image selection support program in accordance with a third embodiment of the present invention.

FIG. 5 is a block diagram showing a configuration of an image selection support apparatus, an image selection support method, and an image selection support program in accordance with the third embodiment of the present invention.

The configuration of the image selection support apparatus in accordance with the third embodiment is, as shown in FIG. 5, a configuration in which the similarity determining section 207 of the above-described second embodiment is replaced with an image photographed state evaluating section 307.

Figure 6:
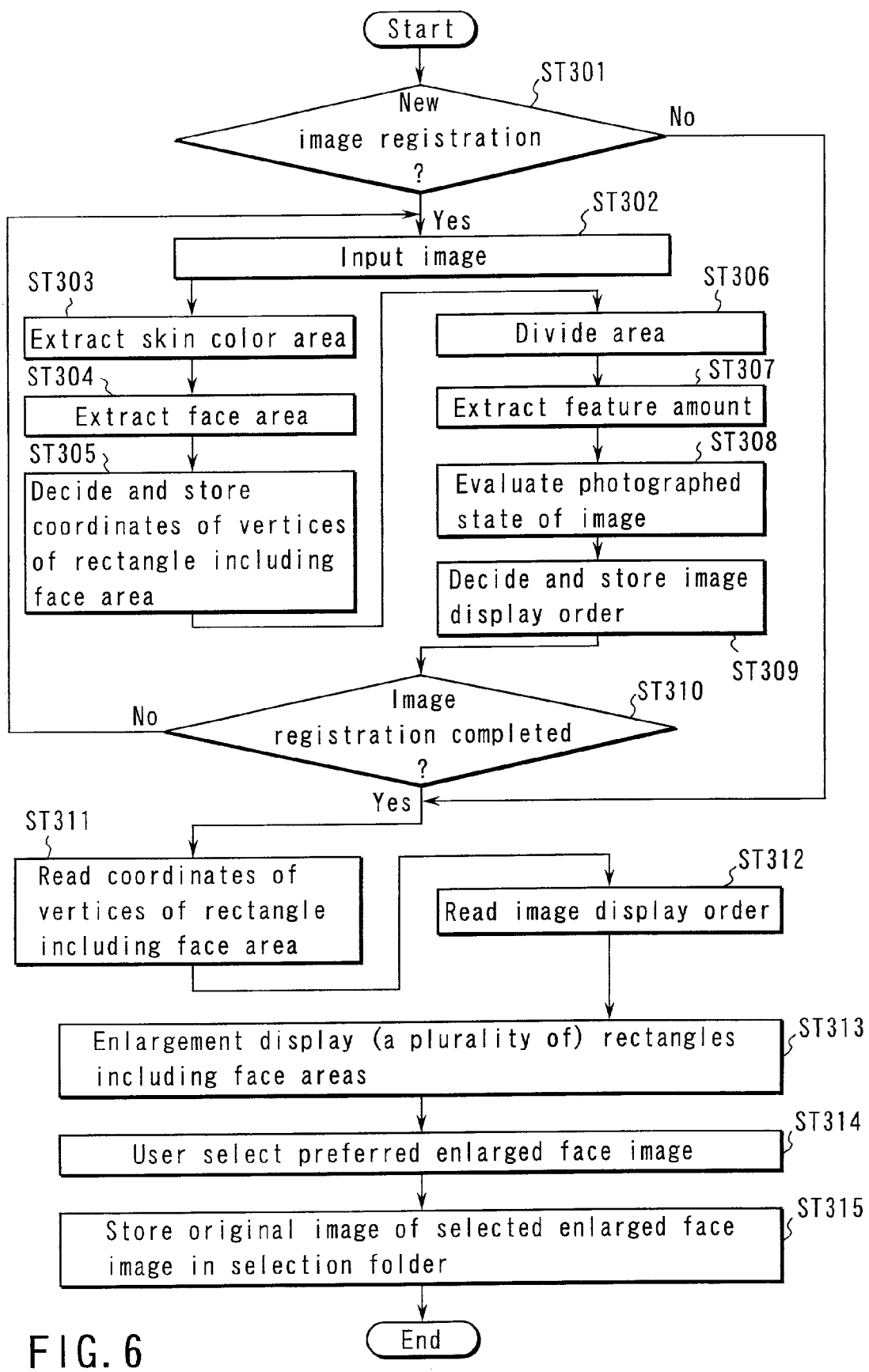
FIG. 6 is a flowchart for explaining operation of the image selection support apparatus, the image selection support method, and the image selection support program in accordance with the third embodiment of the present invention.

FIG. 6 is a flowchart for explaining operation of the image selection support apparatus, the image selection support method, and the image selection support program in accordance with the third embodiment of the present invention.

Namely, as shown in FIG. 6, the flow of processing in accordance with the third embodiment as well is a flow in which the similarity determining of step ST208 in the processing flow of the above-described second embodiment is replaced with an image photographed state evaluating step ST308.

Further, as the evaluating standard of the photographed state in the image photographed state evaluating section 307, for example, the occupying ratio of the face in the image, the state of the openness of the eyes, the orientation of the face, focussing, blurring, brightness, and the like are adopted.

The above-described respective items adopted as the evaluation standard are extracted as a feature amount in the feature amount extracting section 306.

Note that an image can be evaluated by using these items separately or can be evaluated by combining a plurality of standards, and the images are lined up and displayed in the order of good evaluation.

The methods of applying the respective evaluation standards will be described in detail hereinafter.

First, regarding the occupying ratio of the face in the image, even when there are a plurality of persons, a value in which merely the total value of the surface areas of the faces is divided by the surface area of the entire image may be used as the evaluation value, or a value in which the face surface area value having the maximum surface area is divided by the surface area of the entire image may be used as the evaluation value.

Further, as the evaluation standard of the state of openness of the eyes, for example, a degree of roundness of black eyes may be used.

This is effective because the eye can be detected as a black transversely-long line even when the eyes are closed.

Further, as the orientation of the face, the relationship of the detected positions of the eyes and the mouth may be used.

Further, regarding focussing, for example, it suffices that the center point in which the luminance variation of the edge becomes steep is an in-focus point, and to investigate whether or not this is in the face area.

Regarding blurring, for example, the state of the vertical direction dulling at the edge is investigated, and if it is uniform within the entire image, it is hand blurring.

Regarding the brightness, the luminance average of the image may be used.

Note that the evaluation standards are not limited to the examples given herein.

Fourth Embodiment

The fourth embodiment provides a method of automatically displaying an upright image for a human image to overcome the drawback that a longitudinally photographed image is displayed so as to be oriented laterally.

In this way, the user can easily compare the goodness/poorness of the photography.

Figure 7:
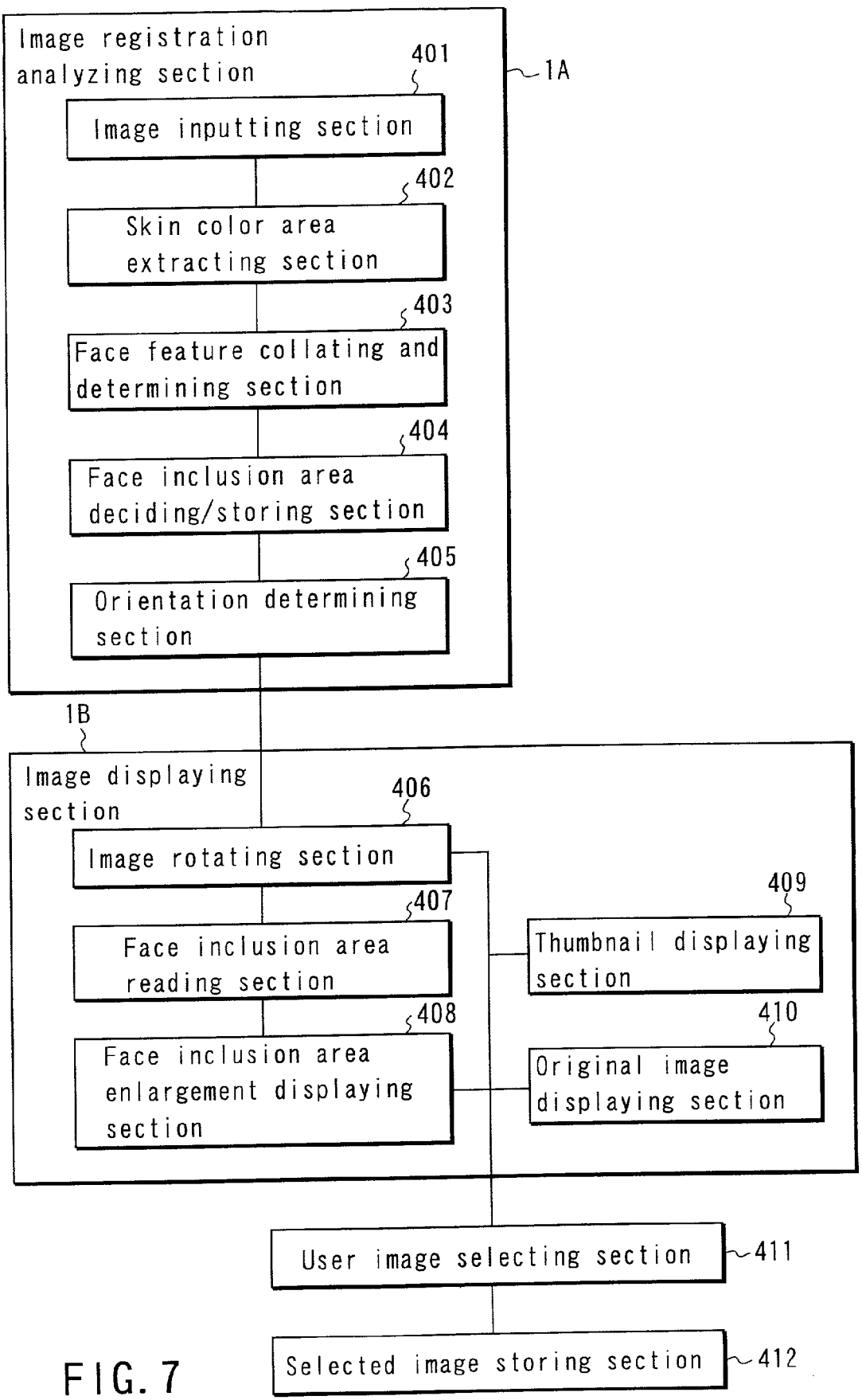
FIG. 7 is a block diagram showing a configuration of an image selection support apparatus, an image selection support method, and an image selection support program in accordance with a fourth embodiment of the present invention.

FIG. 7 is a block diagram showing a configuration of an image selection support apparatus, an image selection support method, and an image selection support program in accordance with the fourth embodiment of the present invention.

Namely, as shown in FIG. 7, the configuration of the image selection support apparatus in accordance with the fourth embodiment is a configuration in which, in addition to the configuration of the above-described first embodiment, an orientation determining section 405 and an image rotating section 406 are added.

Figure 8:
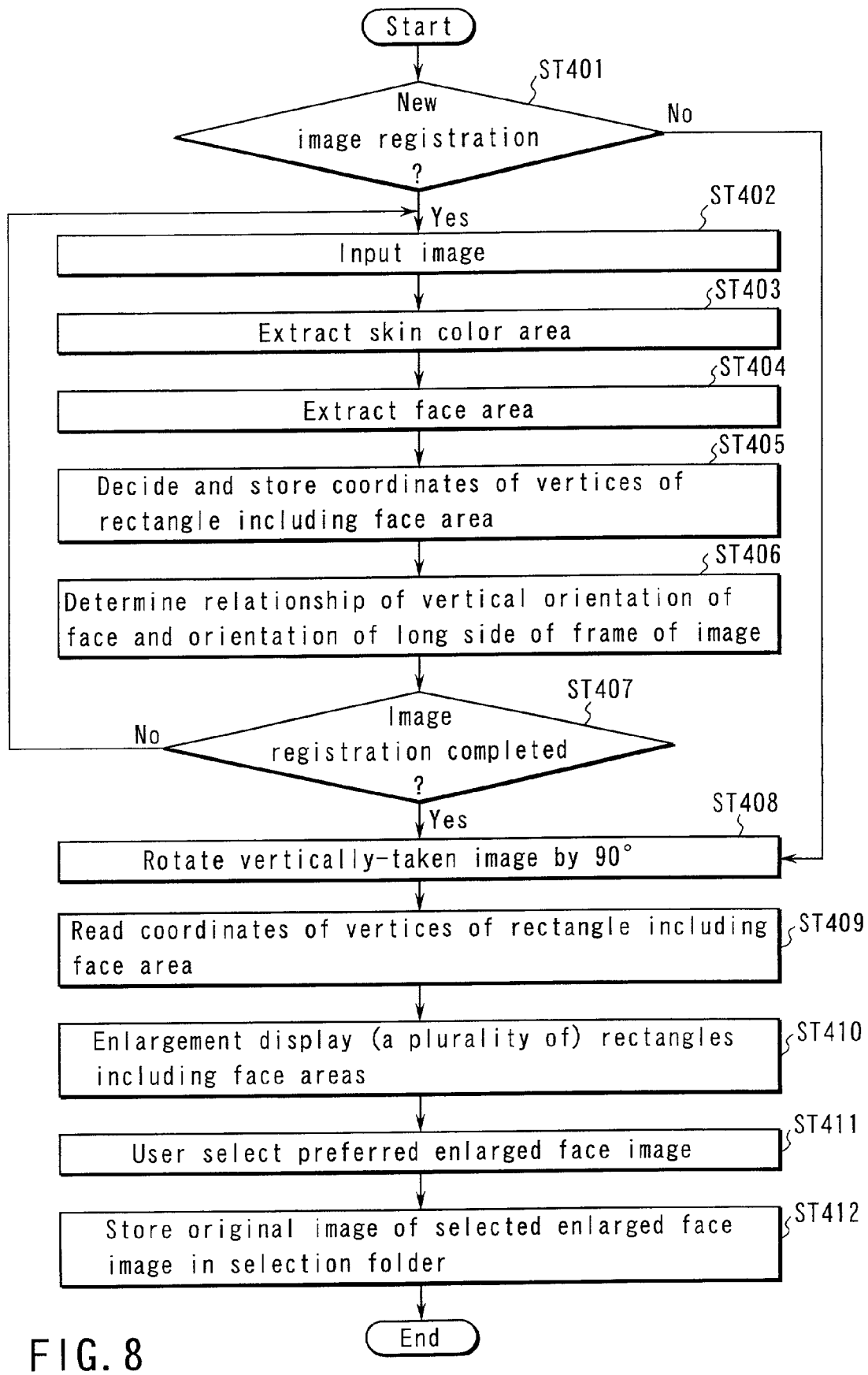
FIG. 8 is a flowchart for explaining operation of the image selection support apparatus, the image selection support method, and the image selection support program in accordance with the fourth embodiment of the present invention.
Figure 10A:
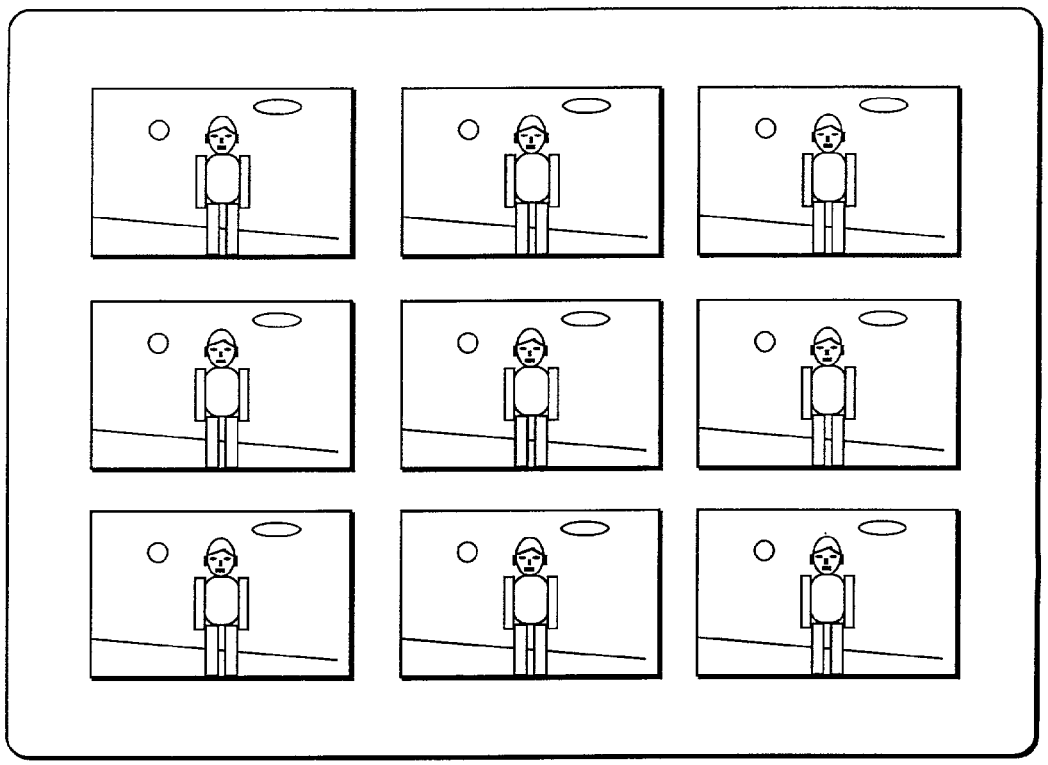
FIG. 10A is a diagram showing a thumbnail (reduction) display as one displaying method in accordance with prior art.
Figure 10B:
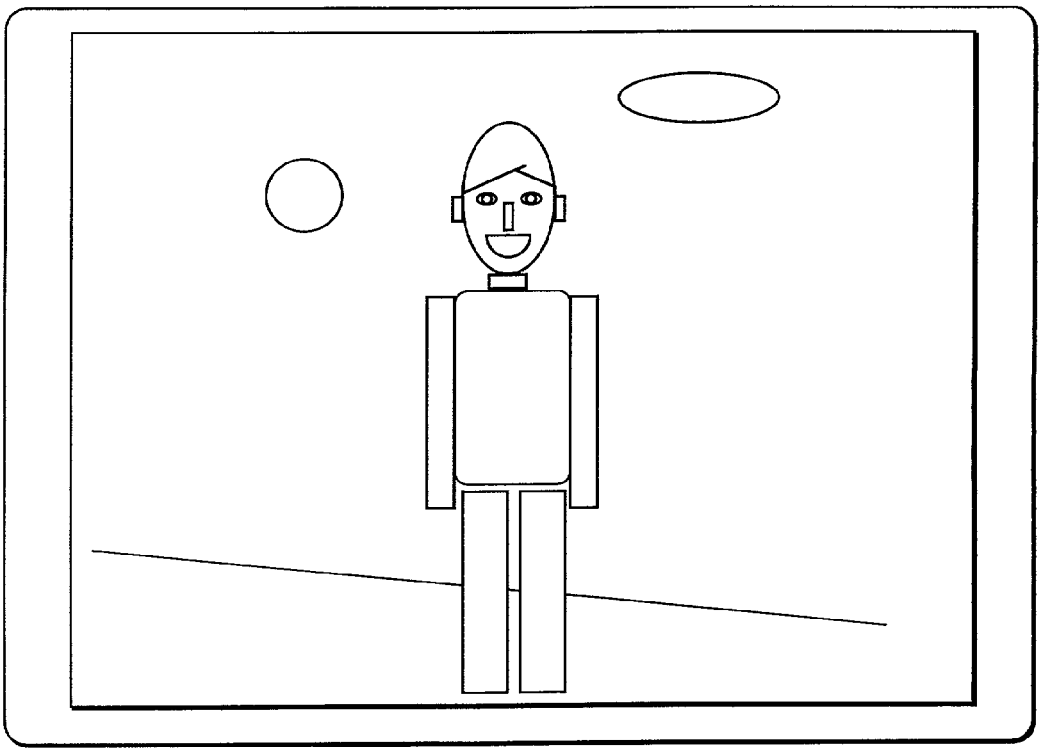
FIG. 10B is a diagram showing a full-screen display by selecting and clicking a thumbnail image of FIG. 10A by a mouse as a second displaying method in accordance with the prior art.

FIG. 8 is a flowchart for explaining operation of the image selection support apparatus, the image selection support method, and the image selection support program in accordance with the fourth embodiment of the present invention.

The flow of the present fourth embodiment will be described simply with regard to the portions not in the flow of the above-described first embodiment.

At a face feature collating and determining section 403 which is similar to that of the above-described first embodiment, the skin color area is elliptically approximated, and it is investigated whether or not the features of the face such as the eyes and mouth can be detected in vicinities of predetermined positions within the ellipse.

At this time, the orientation from the head to the jaw (the vertical orientation of the face) can be detected from the arrangement relationship between the ellipse and the eyes, mouth.

If this orientation is substantially parallel to the long side of the image, processing for determining that this image is longitudinally photographed is executed (step ST406).

Then, processing, in which the image is rotated by 90° such that the orientation from the head to the jaw is a downward orientation, and the image is displayed, is executed (step ST408).

Thereafter, a processing flow which is similar to the flow of the first embodiment is executed.

As described above, in the present invention, face areas are extracted from images, and only a plurality of face areas are enlargement-displayed simultaneously, or are displayed so as to be lined up in order of the state of openness of the eyes or the like. Thus, the burden of work on the user when selecting a well-photographed image can be reduced.

In accordance with a first configuration example of the present invention, only face areas with minute expressions of faces which cannot be confirmed in reduced images are enlargement-displayed. Thus, a plurality of expressions of faces can be observed simultaneously on one screen, and the burden of work on the user when selecting a well-photographed image can be reduced.

Further, in accordance with a second configuration example of the present invention, images having similar content are disposed so as to be lined up closely. Further, a plurality of face areas are enlargement-displayed so as to be lined up. Thus, the burden of work when the user compares similar scenes and extracts several images from thereamong can be reduced.

Further, in accordance with a third configuration example of the present invention, the present apparatus evaluates the goodness/poorness of the photographs, and displays the images in order of the highest evaluation. Thus, the burden of work of the user in selecting well-photographed photographs can be reduced.

Moreover, in accordance with a fourth configuration example of the present invention, images of people are automatically displayed as upright images to overcome the drawback that a longitudinally-photographed image is displayed so as to be oriented laterally. Thus, the user can easily compare the goodness/poorness of the photography.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image selection support apparatus comprising:
   an image inputting section which inputs a plurality of images;
   a specific area inclusion area deciding section which decides an area including a specific area in each of the plurality of images input by the image inputting section using a Kohonen-type learning vector quantization neural net or a Kohonen self-organizing neural net
   an image displaying section which enlarges and displays a plurality of areas, arranged in an array in one screen, that include a specific area in each of the plurality of images determined by the specific area inclusion area deciding section;
   an image selecting section, which allows a user to select a desired image from the plurality of areas that are enlarged and arranged in an array in one screen, and that include the specific area and are displayed by the image displaying section; and
   a selected image storing section, which stores the image selected by the image selecting section, after the image is selected by the image selecting section.

2. An image selection support apparatus according to claim 1, further comprising:
   an area dividing section which divides an image into units having meaning;
   a feature amount extracting section which extracts a physical feature amount of each of the areas divided by the area dividing section;
   a similarity determining section which determines similarities of the feature amounts extracted by the feature amount extracting section and feature amounts of other images with respect to the plurality of images; and
   an image display order deciding and storing section which decides a display order such that the images determined as being similar to each other by the similarity determining section are displayed close to one another, and stores the display order in a memory,
   wherein the image displaying section further comprises an image display order reading section which reads the display order of the images stored in the memory by the display order determining and storing section, and enlarges and displays a plurality of areas, arranged in an array in one screen, that include the specific area in the display order of the images.

3. An image selection support apparatus according to claim 1, further comprising:
   an area dividing section which divides an image into units having meaning;
   a feature amount extracting section which extracts a physical feature amount of each of the areas divided by the area dividing section;
   an image photographed state evaluating section which determines the goodness/poorness of the photography of each of the areas divided by the area dividing section, on the basis of the feature amounts extracted by the feature amount extracting section; and
   an image display order deciding and storing section which decides a display order such that the images are displayed in accordance with the goodness/poorness of the photography of the respective areas evaluated by the image photographed state evaluating section, and stores the display order in a memory, wherein the image displaying section further comprises an image display order reading section which reads the display order of the images stored in the memory by the display order determining and storing section, and enlarges and displays a plurality of areas, arranged in an array in one screen, that include the specific area in the display order of the images.

4. An image selection support apparatus according to claim 1, further comprising an orientation determining section which determines top/bottom orientation of an image, wherein the image displaying section comprises an image rotating converting section which rotates an image by 90° to the right or the left, on the basis of the output of the orientation determining section.

5. An image selection support apparatus according to claim 1, further comprising:
a feature area extracting section which extracts an area having a unique feature in the image input by the image inputting section; and
a specific area feature collating and determining section which determines whether the area having the feature extracted by the feature area extracting section is a specific area,
wherein the specific area inclusion area deciding section decides an area including the specific area determined by the specific area feature collating and determining section.

6. An image selection support apparatus according to claim 5, wherein the feature area extracting section extracts a skin color area as the area having a unique feature, and the specific area feature collating and determining section determines whether the skin color area extracted by the feature area extracting section is the specific area or not by determining whether the skin color area is a face area or not.

7. An image selection support apparatus according to claim 1, wherein the image displaying section enlarges and displays the plurality of areas including the specific area, and reduces and displays an image corresponding to the area including the specific area of the image input by the image inputting section.

8. The image selection support apparatus of claim 1 wherein the specific area inclusion area deciding section decides the area including the specific area in each of the plurality of images input by the image inputting section automatically, without user intervention.

9. The image selection support apparatus of claim 1 wherein the selected image storing section stores the image selected by the image selecting section in a selection folder, after the image is selected by the image selecting section.

10. An image selection support method comprising:
inputting a plurality of images;
deciding an area including a specific area within each of the input plurality of images using a Kohonen-type learning vector quantization neural net or a Kohonen self-organizing neural net;
enlarging and displaying a plurality of areas, arranged in an array in one screen, that include a specific area in each of the plurality of images decided by the act of deciding;
user-selecting a desired image from the plurality of areas that are enlarged and arranged in an array in one screen, and that include the specific area and are displayed by the act of displaying; and
storing the image selected by the act of user selecting, after the image is selected by the act of user-selecting.

11. An image selection support method according to claim 10, further comprising:
dividing an image into units having meaning;
extracting a physical feature amount of each of the divided areas;
determining similarities of the extracted feature amounts and feature amounts of other images with respect to the plurality of images;
deciding a display order such that images determined as being similar to each other are displayed close to one another, and storing the display order in the first memory area; and
enlarging and displaying a plurality of areas, arranged in an array in one screen, that include the specific area in the display order of the images.

12. An image selection method according to claim 10, further comprising:
dividing an image into units having meaning;
determining and evaluating the goodness/poorness of the photography of each of the divided areas; and
deciding a display order such that the images are displayed in accordance with the goodness/poorness of the photography of the respective determined and evaluated areas, and storing the display order in the first memory area, and
displaying the original image comprises reading the display order of the images stored in the first memory area, wherein the act of displaying enlarges and displays a plurality of areas, arranged in an array in one screen, that include the specific area in the display order of the images.

13. An image selection support method according to claim 10, further comprising:
determining top/bottom orientation of an image, and
displaying the original image comprises:
rotating an image by 90° to the right or the left, on the basis of the output of the orientation determination.

14. An image selection support method according to claim 10, further comprising:
extracting an area having a unique feature in the image input by the act of inputting; and
determining whether the area having the feature extracted by the act of extracting is a specific area,
wherein the deciding decides an area including the specific area determined by the act of determining.

15. An image selection support method according to claim 14, wherein the act of extracting extracts a skin color area as the area having a unique feature, and the act of determining determines whether the skin color area extracted by the act of extracting is the specific area or not by determining whether the skin color area is a face area or not.

16. An image selection support method according to claim 10, wherein the act of displaying enlarges and displays the plurality of areas including the specific area, and reduces and displays an area corresponding to the area including the specific area of the image input by the act of inputting.

17. An image selection support method according to claim 10, further comprising storing the image selected by the act of selecting in a memory.

18. A computer readable medium having stored thereon computer readable programs to support image selection by a computer, the computer readable programs comprising:
a first computer readable program which makes the computer execute an image inputting step of inputting a plurality of images;
a second computer readable program which makes the computer execute a specific area inclusion area deciding step of deciding an area including the specific area within each of the plurality of images input in the image inputting step using a Kohonen-type learning vector quantization neural net or a Kohonen self-organizing neural net;

a third computer readable program which makes the computer execute a displaying step of enlarging and displaying a plurality of areas, arranged in an array in one screen, that include a specific area in each of the plurality of images determined by the specific area inclusion area deciding step;

a fourth computer readable program which makes the computer execute an image selecting step of allowing a user to select a desired image from the plurality of areas that are enlarged and arranged in an array in one screen, and that include the specific area and are displayed by the displaying step; and a fifth computer readable program which makes the computer execute a selected image storing step of storing the image selected by the image selecting step, after the image is selected by the image selecting step.

19. A computer readable medium having stored thereon computer readable programs according to claim 18, the computer readable programs further comprising:

a sixth computer readable program which makes the computer execute an area dividing step of dividing an image into units having meaning;

a seventh computer readable program which makes the computer execute a feature amount extracting step of extracting a physical feature amount of each of the areas divided by the area dividing step;

an eighth computer readable program which makes the computer execute a similarity determining step of determining similarities of the feature amounts extracted by the feature amount extracting step and feature amounts of other images with respect to the plurality of images;

a ninth computer readable program which makes the computer execute an image display order deciding and storing step of deciding a display order such that the images determined as being similar to each other by the similarity determining step are displayed close to one another, and storing the display order in a memory; and the third computer readable program which makes the computer execute the displaying step comprising:

a tenth computer readable program which makes the computer execute an image display order reading step of reading the display order of the images stored in the memory by the display order deciding and storing step, and enlarges and displays a plurality of areas, arranged in an array in one screen, that include the specific area in the display order of the images.

20. A computer readable medium having stored thereon computer readable programs according to claim 18, the computer readable programs further comprising:

a sixth computer readable program which makes the computer execute an area dividing step of dividing an image into units having meaning;

a seventh computer readable program which makes the computer execute an image photographed state evaluating step of determining the goodness/poorness of the photography of each of the areas divided by the area dividing step; and an eighth computer readable program which makes the computer execute an image display order deciding and storing step of deciding a display order such that the images are displayed in accordance with the goodness/poorness of the photography of the respective areas evaluated by the image photographed state evaluating step, and storing the display order in a memory, and the third computer readable program which makes the computer execute the image displaying step comprises:

a ninth computer readable program which makes the computer execute an image display order reading step of reading the display order of the images stored in the memory by the display order deciding and storing step, and enlarges and displays a plurality of areas, arranged in an array in one screen, that include the specific area in the display order of the images.

21. A computer readable medium having stored thereon computer readable programs according to claim 18, the computer readable programs further comprising:

a sixth computer readable program which makes the computer execute an orientation determining step of determining top/bottom orientation of an image, and the third computer readable program which makes the computer execute the image displaying step comprises:

a seventh computer readable program which makes the computer execute an image rotating converting step of rotating an image by 90° to the right or the left, on the basis of the output of the orientation.

22. A computer readable medium having stored thereon computer readable programs according to claim 18, the computer readable programs further comprising:

a sixth computer readable program which makes the computer execute a feature area extracting step which extracts an area having a unique feature in the image input by the image inputting section; and a seventh computer readable program which makes the computer execute a specific area feature collating and determining step which determines whether the area having the feature extracted by the feature area extracting step is a specific area, wherein the specific area inclusion area deciding section decides an area including the specific area determined by the specific area feature collating and determining step.

23. A computer readable medium having stored thereon computer readable programs according to claim 22, wherein the feature area extracting step extracts a skin color area as the area having a unique feature, and the specific area feature collating and determining step determines whether the skin color area extracted by the feature area extracting section is the specific area or not by determining whether the skin color area is a face area or not.

24. A computer readable medium having stored thereon computer readable programs according to claim 18, wherein the image displaying step enlarges and displays the plurality of areas including the specific area, and reduces and displays an area corresponding to the area including the specific area of the image input by the image inputting step.

25. A computer readable medium having stored thereon computer readable programs according to claim 18, the computer readable programs further comprising a sixth computer readable program which makes the computer execute a selected image storing step which stores the image selected by the image selecting step in a memory.

26. An image selection support apparatus comprising:

an image inputting section which inputs a plurality of images;

a specific area inclusion area deciding section which decides an area including a specific area in each of the plurality of images input by the image inputting section an image displaying section which enlarges and displays a plurality of areas, arranged in an array in one screen, that include a specific area in each of the plurality of images determined by the specific area inclusion area deciding section;

an image selecting section, which allows a user to select a desired image from the plurality of areas that are enlarged and arranged in an array in one screen, and that include the specific area and are displayed by the image displaying section;

an area dividing section which divides an image into units having meaning;

a feature amount extracting section which extracts a physical feature amount of each of the areas divided by the area dividing section;

a similarity determining section which determines similarities of the feature amounts extracted by the feature amount extracting section and feature amounts of other images with respect to the plurality of images; and an image display order deciding and storing section which decides a display order such that the images determined as being similar to each other by the similarity determining section are displayed close to one another, and stores the display order in a memory, wherein the image displaying section further comprises an image display order reading section which reads the display order of the images stored in the memory by the display order determining and storing section, and enlarges and displays a plurality of areas, arranged in an array in one screen, that include the specific area in the display order of the images.

27. An image selection support method comprising:

inputting a plurality of images;

deciding an area including a specific area within each of the input plurality of images;

enlarging and displaying a plurality of areas, arranged in an array in one screen, that include a specific area in each of the plurality of images decided by the act of deciding;

user-selecting a desired image from the plurality of areas that are enlarged and arranged in an array in one screen, and that include the specific area and are displayed by the act of displaying;

dividing an image into units having meaning;

extracting a physical feature amount of each of the divided areas;

determining similarities of the extracted feature amounts and feature amounts of other images with respect to the plurality of images;

deciding a display order such that images determined as being similar to each other are displayed close to one another, and storing the display order in the first memory area; and enlarging and displaying a plurality of areas, arranged in an array in one screen, that include the specific area in the display order of the images.

28. A computer readable medium having stored thereon computer readable programs to support image selection by a computer, the computer readable programs further comprising:

a first computer readable program which makes the computer execute an image inputting step of inputting a plurality, of images;

a second computer readable program which makes the computer execute a specific area inclusion area deciding step of deciding an area including the specific area within each of the plurality of images input in the image inputting step;

a third computer readable program which makes the computer execute a displaying step of enlarging and displaying a plurality of areas, arranged in an array in one screen, that include a specific area in each of the plurality of images determined by the specific area inclusion area deciding step;

a fourth computer readable program which makes the computer execute an image selecting step of allowing a user to select a desired image from the plurality of areas that are enlarged and arranged in an array in one screen, that include the specific area and are displayed by the displaying step;

a fifth computer readable program which makes the computer execute an area dividing step of dividing an image into units having meaning;

a sixth computer readable program which makes the computer execute a feature amount extracting step of extracting a physical feature amount of each of the areas divided by the area dividing step;

a seventh computer readable program which makes the computer execute a similarity determining step of determining similarities of the feature amounts extracted by the feature amount extracting step and feature amounts of other images with respect to the plurality of images;

an eighth computer readable program which makes the computer execute an image display order deciding and storing step of deciding a display order such that the images determined as being similar to each other by the similarity determining step are displayed close to one another, and storing the display order in a memory; and the third computer readable program which makes the computer execute the displaying step comprising:

a ninth computer readable program which makes the computer execute an image display order reading step of reading the display order of the images stored in the memory by the display order deciding and storing step, and enlarges and displays a plurality of areas, arranged in an array in one screen, that include the specific area in the display order of the images.

* * * * *